Figure 1:
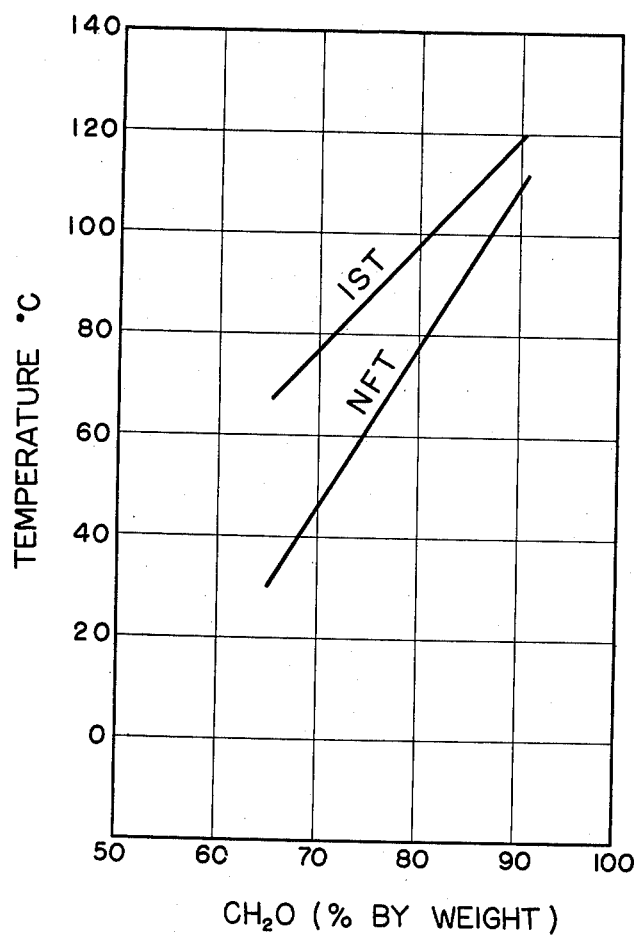

FIG. I.

United States Patent Office 3,077,441
Patented Feb. 12, 1963

3,077,441
METHOD OF RECTIFYING A FORMALDEHYDE-CONTAINING SOLUTION
Shinjiro Kodama, Sakyo-ku, Kyoto, and Daisuke Komiyama, Keikoku Mori, and Tatsuo Ando, Kaneko, Niihama-shi, Japan, assignors to Sumitomo Chemical Company, Ltd., Osaka, Japan, a corporation of Japan
Filed Feb. 4, 1959, Ser. No. 791,220
Claims priority, application Japan July 26, 1958
1 Claim. (Cl. 202—52)

This invention relates to methods of rectifying solutions containing formaldehyde which methods comprise distilling off methanol from an aqueous solution of formaldehyde containing the methanol and obtaining highly concentrated aqueous formaldehyde solution suitable for use in the production of a formaldehyde polymer which has a low content of formic acid and a good solubility.

In evaluating the linear polymer product of formaldehyde known as lower polyoxymethylene glycols or paraformaldehyde, one of the important factors is the formic acid content. Formic acid is produced chiefly by a reaction represented by the followed formula when a formaldehyde-containing solution is heated.

$$2HCHO + H_2O = HCOOH + CH_3OH \qquad (1)$$

In order to produce a normally solid formaldehyde polymer, many attempts to distill and concentrate a formaldehyde-containing solution (e.g. formalin), have been made in the prior art. However, in most cases, the production of formic acid increases with the increase of concentration of formaldehyde and, in addition, the concentrated formaldehyde-containing solution tends to be partially solidified at the bottom of the distilling tower with a loss of fluidity whereby the recovery thereof from the bottom of the tower becomes impossible.

It is an object of this invention to obtain a concentrated formaldehyde solution under clear conditions free from partially solidified substances, said solution being capable of yielding a normally solid, linear formaldehyde polymer which may be solidified upon cooling but having an excellent solubility. It is another object of this invention to provide a method of restricting a formic acid-producing reaction in a commercial operation wherein a formaldehyde-water-methanol solution containing a high concentration of formaldehyde is rectified to distil off methanol exclusively. It is still another object of the invention to provide a method suitable for removing methanol from the highly concentrated formaldehyde solution obtained by a high temperature fractional condensation or high temperature absorption of methanol oxidation gas.

According to the invention, we provide a method which comprises rectifying a solution consisting of three components, i.e. formaldehyde, water and methanol and containing from 50% to 80% by weight of formaldehyde under the conditions of a top-of-tower pressure 160–660 mm./Hg, a top-of-tower temperature 30°–61° C. and a methanol reflux ratio 5–15, exclusively distilling off the methanol from the top of the tower and recovering a hot, clear, concentrated (65–85%) formaldehyde solution free from formic acid and methanol from the bottom of the tower.

Figure 2:
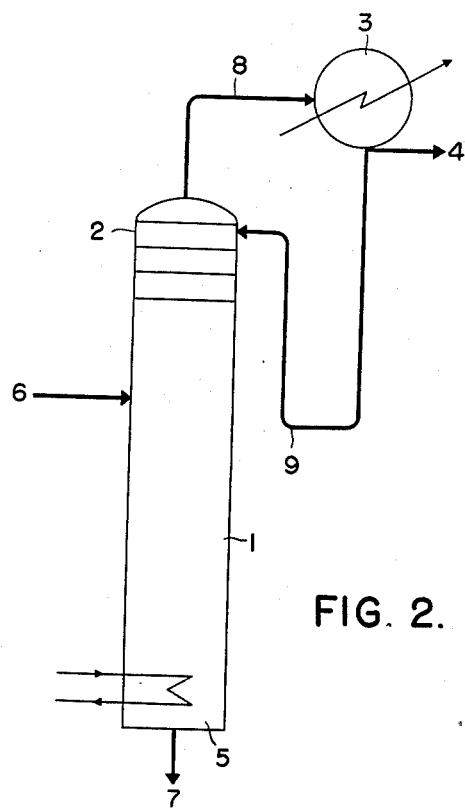

In order that the invention may be fully understood it will now be described with reference to the accompanying drawing in which FIG. 1 is a graph showing a relationship between the temperature and the phase of a formaldehyde polymer and FIG. 2 diagrammatically illustrates apparatus for practicing the invention.

According to our study upon the variation of the states of a normally solid formaldehyde polymer there exist two kinds of special values, i.e. an initial solidifying temperature and a non-fluidity temperature with respect to the linear formaldehyde polymer.

The initial solidifying temperature (IST) is a temperature at which a solid phase begins to appear in the liquid formaldehyde polymer solution, and the non-fluidity temperature (NFT) is a transition temperature between the condition under which a liquid phase and a solid phase coexist and the condition under which formaldehyde exists as solid phase, and it has now been found that the both temperatures depend upon the concentration of formaldehyde. Thus according to the graph showing IST and NFT lines within a range of concentrations of formaldehyde between 65% and 90% with respect to a binary system of formaldehyde and water, such a highly concentrated aqueous formaldehyde solution exists as a perfect liquid phase in the high temperature side above IST line, exists as a liquid and solid phase in the medium temperature side between the IST line and the NFT line and is solidified to a solid phase at temperatures below the NFT line.

Accordingly, in order to rectify and concentrate a concentrated formaldehyde-water-methanol solution, it is necessary to maintain an aqueous solution of formaldehyde near the bottom of the tower at temperatures at least above the IST line corresponding to its formaldehyde concentration, thus keeping it in a perfect liquid phase. If the temperature is below the IST line a partial solid phase or an overall solidification appears, causing plugging of outlet pipes used for withdrawing the liquids from the inside or bottom of the tower, even making it impossible to continue the operation.

If the temperature of the liquid at the bottom of the tower be above the IST line it would be possible to overcome such difficulties as encountered in the described solidification or semi-solidification of the highly concentrated aqueous solution of formaldehyde, a much more strict control of temperature should be made when the temperature of the liquid is raised, since the production of formic acid would be remarkably increased.

According to our study, it has been found that the production velocity of formic acid in the case of heating a highly concentrated formaldehyde solution becomes about 2.5 times as much per each temperature rise of 10° C. at or near the distillation temperature of the solution. Also according to our experiments, the amount of formic acid in the liquid withdrawn from the bottom of the tower is remarkably increased if the inside-tower temperature rises over about 108° C. Consequently, a normally solid formaldehyde polymer produced from the formaldehyde solution that has been heated to 108° C. or more in the rectification step is practically unsuitable as a commercial product. For these reasons, the inside-tower temperature should be restricted to 108° C. or less, and thus on 85% concentration of the formaldehyde solution corresponding to the value of 108° C. on the IST line of the drawing is regarded as the upper limit of the concentration of formaldehyde employed by the invention.

Accordingly, a normally solid linear formaldehyde polymer obtained by cooling and solidifying an aqueous concentrated formaldehyde solution which has been subjected to a concentration step has a formaldehyde concentration of not more than 85% as long as it is not subjected to a subsequent drying step.

The weight ratio of formaldehyde to water in the ternary solution of formaldehyde-water-methanol to which the present invention may be applied is 65 to 85:35 to 15 wherein the content of methanol is not critical. In rectifying such a ternary solution according to the invention, the top-of-tower viz the pressure over the highest plate of the rectifying plate of the rectifying column, of 160–

660 mm./Hg (abs.), the top-of-tower temperature of 30°–61° C. or the boiling point of methanol corresponding to the above pressure and the reflux ratio of 5–15 may be used. Rectification made under such top-of-tower conditions and at the described bottom-of-tower temperature makes it possible to distil off exclusively methanol from the top of the rectifying tower while obtaining an aqueous formaldehyde solution having a concentration of no more than 85% as a perfect liquid having little content of formic acid from the bottom of the tower. An excessively reduced pressure of less than 160 mm./Hg necessitates provision of a complicated apparatus without the corresponding merits, so the top-of-tower pressure need not be reduced to below 160 mm./Hg in the practice of the invention.

The reason for restricting the reflux ratio of methanol in the rectification step of the invention to the described value is that the operation at the reflux ratio of more than 15 prolongs the residence time inside the tower of the liquid thus increasing the production of formic acid while the operation at the reflux ratio of less than 5 makes it difficult to distil off a pure methanol. A pure methanol obtained from the top of the tower according to the invention may be used for the production of formaldehyde by means of a gaseous phase contact conversion. In case a highly concentrated formaldehyde water-methanol solution supplied to a rectifying tower has previously contained a comparatively large amount of formic acid, it is preferable to remove the formic acid prior to rectification by a treatment with an anion-exchange resin such as Amberlite A-45 (matrix; polystyren. act. group; sec.-, tert-amine) Duolite A-114 (matrix; porous hydrocarbon. act. group; prim.-, sec.-, tert.-amine), or Duolite (matrix; phenolic resin, act. group; prim.-, sec.-, tert.-amine).

Broadly speaking, the weight ratio of formaldehyde to water in a formaldehyde solution to which the invention is applicable is below 85:15. However, in view of the fact that the lower limit of the formaldehyde concentration of a formaldehyde polymer produced on a commercial scale is usually about 65%, the concentration of a concentrated aqueous solution of formaldehyde practically obtained in the practice of the invention should also be limited to at least 65%.

A particularly desirable material as a formaldehyde-containing solution to which the invention is applicable is a solution obtainable by a fractional condensation or absorption at high temperatures of a hot gas produced by a contact conversion of methanol. Thus, a mixing gas of methanol and an oxygen-containing gas such as air, a mixture of air and nitrogen gas or a mixture of air and steam is subjected to conversion at 450° to 700° C. in the presence of a catalyst such as silver, copper, platinum, ferric oxide, vanadium oxide and molybdenum oxide into formaldehyde containing gas, which is fractionally condensed at high temperatures such at 55° to 90° C., or absorbed in a liquid circulating at such temperatures, to produce a ternary solution consisting of formaldehyde-water-methanol having a high content of formaldehyde.

If the present invention is applied to the particular one of such tenary solutions in which the weight ratio of formaldehyde and water is within a range of 65–85:35–15, a clear aqueous formaldehyde solution having not more than 0.05% by weight of formic acid can be obtained from the bottom of the tower which, upon cooling and solidifying, produces a normally solid formaldehyde polymer. It is thus obvious that the production of a normally solid formaldehyde polymer may be surprisingly simplified by such process. In case the solution contains some formic acid coming from the conversion step or the high temperature absorption step it may also be removed, if necessary, by means of an ion-exchange resin prior to rectification.

The hot, clear, concentrated formaldehyde solution having a concentration of 65 to 85% obtained by the invention may be cooled by a conventional cooling apparatus to below the NFT and, if necessary, subjected to a drying step, whereby a solid paraformaldehyde of good solubility in a form of flake, pellet or crepe, etc., may be obtained.

The following examples are given by way of illustration and are not intended as limitation on the scope of this invention.

Example 1

In FIG. 2, diagrammatically illustrating one type of apparatus provided in accordance with the present invention, a solution containing 71% by weight of formaldehyde, 8.97% by weight of methanol, 20% by weight of water and 0.005% by weight of formic acid is introduced through the pipe 6 at a rate of 100 kg./hr. into the 40th stage from the bottom of a rectifying tower 1 having sixty plates and rectified under such conditions that the pressure at the top 2 of rectifying tower is 350 mm./Hg (abs.), the temperature at the outlet of the tower top is 45° C., the temperature at the bottom 5 of the tower is 95° C., and the reflux ratio of methanol is 5.

A hot, clear solution consisting of 78% by weight of formaldehyde, 20.95% by weight of water, 0.02% by weight of formic acid and 0.03% by weight of methanol is thus obtained in an amount of 91 kg./hr. from the bottom 5 of the tower through pipe 7.

In addition, the top-of-tower gas is led into the condenser 3 through pipe 8, and then a portion of it is refluxed back to the top of rectifying column 1 through pipe 9, while the remaining portion of the said top-of-tower gas is obtained as 8.5 kg./hr. pure methanol through pipe 4.

Example 2

A solution which has been obtained by treating a solution containing 0.5% formic acid with Amberlite IR-45 to eliminate a substantial amount of said formic acid and which is composed of 62% by weight of formaldehyde, 25.3% by weight of methanol, 12.7% by weight of water and 0.006% by weight of formic acid is introduced at a rate of 100 kg./hr. into 50th stage from the bottom of the rectifying tower provided with seventy plates therein, and rectified under the conditions of a top-of-tower pressure of 560 mm./Hg (abs.), a top-of-tower temperature of 57° C., a bottom-of-tower temperature of 105° C. and a reflux ratio of 15. A clear, hot solution composed of 83% by weight of formaldehyde, 16.92% by weight of water, 0.05% by weight of methanol and 0.03% by weight of formic acid is thus obtained in an amount of 74.5 kg./hr. from the bottom of the tower, while 25 kg./hr. of methanol is recovered from the condenser from a top-of-tower gas, which methanol may readily be used as a material for the production of formaldehyde.

Example 3

A solution which has been obtained by treating a solution containing 0.1% by weight of formic acid with Duolite A-114 to eliminate a substantial amount of said formic acid and which is composed of 57.0% by weight of formaldehyde, 18.7% by weight of methanol, 24.4% by weight of water and 0.004% by weight of formic acid is introduced at a rate of 110 kg./hr. into 35th stage from the bottom of the rectifying tower provided with fifty five plates therein, and rectified under such conditions that the top-of-tower pressure is 200 mm./Hg (abs.), the top-of-tower temperature is 35° C., the temp. at the bottom of tower is 80° C. and the reflux ratio is 10. A clear, hot solution composed of 70% by weight of formaldehyde, 29.95% by weight of water, 0.04% by weight of methanol and 0.01% by weight of formic acid is thus obtained in an amount of 89.0 kg./hr. from the bottom of the tower, while 20 kg./hr. of methanol is recovered from the condenser from the top-of-tower gas, which methanol may readily be used as a material for production of formaldehyde.

What we claim is:

A method of continuously rectifying a ternary solution composed of formaldehyde-water-methanol which contains from 50 to 80% by weight of formaldehyde and in which the weight ratio of formaldehyde to water is 65 to 85:35 to 15, which consists essentially of continuously introducing the ternary solution into a rectification zone, rectifying the ternary solution at a temperature of 30–60° C. and at a pressure of 160–660 mm./Hg at the top of the rectification zone and at a methanol reflux ratio of 5–15, thereby to distil pure methanol from the top of the rectification zone and continuously recovering a hot, clear, concentrated formaldehyde aqueous solution substantially free from formic acid and methanol from the bottom of the rectification zone in a concentration of about 65 to 85% and at a temperature of no more than 108° centigrade.

References Cited in the file of this patent

UNITED STATES PATENTS

| | | |
|---|---|---|
| 2,527,655 | Pyle et al. | Oct. 31, 1950 |
| 2,565,569 | McCants | Aug. 28, 1951 |
| 2,676,143 | Lee et al. | Apr. 20, 1954 |
| 2,798,033 | Lloyd | July 2, 1957 |
| 2,823,237 | McCants | Feb. 11, 1958 |

OTHER REFERENCES

Walker: Formaldehyde, 2nd ed. (1953), pp. 28–30, 103–104, 13, 14 and 126, 127.